United States Patent
Mantoku et al.

(10) Patent No.: US 12,119,517 B2
(45) Date of Patent: Oct. 15, 2024

(54) SECONDARY BATTERY

(71) Applicant: SANYO Electric Co., Ltd., Daito (JP)

(72) Inventors: Norie Mantoku, Osaka (JP); Oose Okutani, Hyogo (JP); Kyosuke Miyata, Osaka (JP)

(73) Assignee: PANASONIC ENERGY CO., LTD., Osaka (JP)

( * ) Notice: Subject to any disclaimer, the term of this patent is extended or adjusted under 35 U.S.C. 154(b) by 108 days.

(21) Appl. No.: 16/979,727

(22) PCT Filed: Feb. 13, 2019

(86) PCT No.: PCT/JP2019/005072
§ 371 (c)(1),
(2) Date: Sep. 10, 2020

(87) PCT Pub. No.: WO2019/181285
PCT Pub. Date: Sep. 26, 2019

(65) Prior Publication Data
US 2021/0043915 A1 Feb. 11, 2021

(30) Foreign Application Priority Data
Mar. 23, 2018 (JP) ................. 2018-056527

(51) Int. Cl.
*H01M 50/533* (2021.01)
*H01M 50/583* (2021.01)
(Continued)

(52) U.S. Cl.
CPC ....... *H01M 50/533* (2021.01); *H01M 50/583* (2021.01); *H01M 50/534* (2021.01);
(Continued)

(58) Field of Classification Search
CPC ............ H01M 50/583; H01M 50/572; H01M 50/531; H01M 50/543
See application file for complete search history.

(56) References Cited

U.S. PATENT DOCUMENTS

| 2010/0028762 A1 | 2/2010 | Yokoyama et al. |
| 2010/0104941 A1 | 4/2010 | Nakabayashi |

(Continued)

FOREIGN PATENT DOCUMENTS

| CN | 101529615 A | 9/2009 |
| CN | 106796857 A | 5/2017 |

(Continued)

OTHER PUBLICATIONS

Machine translation of JP2003077448A (Year: 2003).*

(Continued)

*Primary Examiner* — Cynthia K Walls
(74) *Attorney, Agent, or Firm* — WHDA, LLP

(57) ABSTRACT

The purpose of the present disclosure is to provide a secondary battery in which a current interruption function of an electrode tap can be enhanced during an external short circuit, and a temperature rise in the battery can be effectively suppressed. A secondary battery according to one embodiment of the present disclosure is provided with: an electrode assembly having a positive electrode, a negative electrode, and a separator disposed between the positive electrode and the negative electrode; a sealing assembly constituting a positive terminal; a case body constituting a negative terminal; a positive electrode tap connecting the positive electrode and the sealing assembly; and a negative electrode tap connecting the negative electrode and the case body, wherein the positive electrode has a fuse part which has a relatively small cross-sectional area in the positive (Continued)

electrode, and the fuse part of the positive electrode is metallurgically bonded to the sealing assembly.

12 Claims, 6 Drawing Sheets

(51) Int. Cl.
  *H01M 50/534* (2021.01)
  *H01M 50/536* (2021.01)
  *H01M 50/553* (2021.01)
  *H01M 50/559* (2021.01)
(52) U.S. Cl.
  CPC ........ *H01M 50/536* (2021.01); *H01M 50/553* (2021.01); *H01M 50/559* (2021.01)

(56) References Cited

U.S. PATENT DOCUMENTS

| | | | | |
|---|---|---|---|---|
| 2013/0078505 | A1* | 3/2013 | Kim | .................. H01M 10/0431 |
| | | | | 429/179 |
| 2015/0050532 | A1* | 2/2015 | Waigel | ................ H01M 50/509 |
| | | | | 429/61 |
| 2015/0364744 | A1 | 12/2015 | Takano et al. | |
| 2017/0250394 | A1 | 8/2017 | Wakimoto et al. | |
| 2017/0358785 | A1* | 12/2017 | Hattori | ................ H01M 50/264 |
| 2018/0083302 | A1 | 3/2018 | Koo et al. | |

FOREIGN PATENT DOCUMENTS

| | | | | |
|---|---|---|---|---|
| JP | 2003-77448 | A | | 3/2003 |
| JP | 2010-33949 | A | | 2/2010 |
| JP | 2013-54915 | A | | 3/2013 |
| JP | 2014-67532 | A | | 4/2014 |
| JP | 2014-146516 | A | | 8/2014 |
| JP | 2017-157334 | A | | 9/2017 |
| KR | 20130003148 | A * | 9/2013 | .......... H01M 50/581 |
| WO | 2016/121965 | A1 | | 8/2016 |
| WO | 2017/130715 | A1 | | 8/2017 |

OTHER PUBLICATIONS

International Search Report dated Mar. 3, 2019, issued in counterpart International Application No. PCT/JP2019/005072. (1 page).
English Translation of Office Action dated Apr. 13, 2022, issued in counterpart to CN Application No. 201980021148.4. (4 pages).
English Translation of Chinese Office Action dated Oct. 18, 2022 for the related Chinese Patent Application No. 201980021148.4.

* cited by examiner

SECONDARY BATTERY

TECHNICAL FIELD

The present invention relates to a secondary battery.

BACKGROUND ART

Secondary batteries have recently been spread in applications to, for example, power-supply devices which supply power to motors allowing vehicles such as electric cars to be run, and electric storage devices which store natural energy and midnight power. Such secondary batteries not only are expected to be further increased in capacity, but also are demanded to have battery safety.

Examples of secondary batteries include a secondary battery comprising an electrode assembly having a positive electrode, a negative electrode and a separator interposed between the positive electrode and the negative electrode, a positive electrode terminal, a negative electrode terminal, a positive electrode tab which connects the positive electrode and the positive electrode terminal, and a negative electrode tab which connects the negative electrode and the negative electrode terminal, wherein a fuse function is provided on the positive electrode tab or the negative electrode tab (see, for example, Patent Literatures 1 and 2).

CITATION LIST

Patent Literature

PATENT LITERATURE 1: Japanese Unexamined Patent Application Publication No. 2010-33949
PATENT LITERATURE 2: Japanese Unexamined Patent Application Publication No. 2003-77448

SUMMARY

According to the secondary batteries of Patent Literatures 1 and 2, the positive electrode tab or the negative electrode tab is fused by the fusing function of the positive electrode tab or the negative electrode tab in external short-circuit, resulting in current blocking. Thus, an increase in battery temperature is suppressed and battery safety is achieved. It, however, is important for ensuring further battery safety to enhance a current blocking function by an electrode tab (positive electrode tab or negative electrode tab) and further suppress an increase in battery temperature.

It is an advantage of the present disclosure is then to provide a secondary battery which can be enhanced in current blocking function of an electrode tab in external short-circuit to effectively suppress an increase in battery temperature.

A secondary battery according to one aspect of the present disclosure comprises an electrode assembly having a positive electrode, a negative electrode and a separator interposed between the positive electrode and the negative electrode, a positive electrode terminal, a negative electrode terminal, a positive electrode tab which connects the positive electrode and the positive electrode terminal, and a negative electrode tab which connects the negative electrode and the negative electrode terminal, wherein the positive electrode tab has a fuse part relatively small in sectional area, of the positive electrode tab, and the fuse part of the positive electrode tab is metallurgically bonded to the positive electrode terminal.

A secondary battery according to one aspect of the present disclosure comprises an electrode assembly having a positive electrode, a negative electrode and a separator interposed between the positive electrode and the negative electrode, a positive electrode terminal, a negative electrode terminal, a positive electrode tab which connects the positive electrode and the positive electrode terminal, and a negative electrode tab which connects the negative electrode and the negative electrode terminal, wherein the negative electrode tab has a fuse part relatively small in sectional area, of the negative electrode tab, and the fuse part of the negative electrode tab is metallurgically bonded to the negative electrode terminal.

According to the present disclosure, there can be provided a secondary battery which can be enhanced in current blocking function of an electrode tab in external short-circuit to effectively suppress an increase in battery temperature.

DESCRIPTION OF EMBODIMENTS

Figure 1:
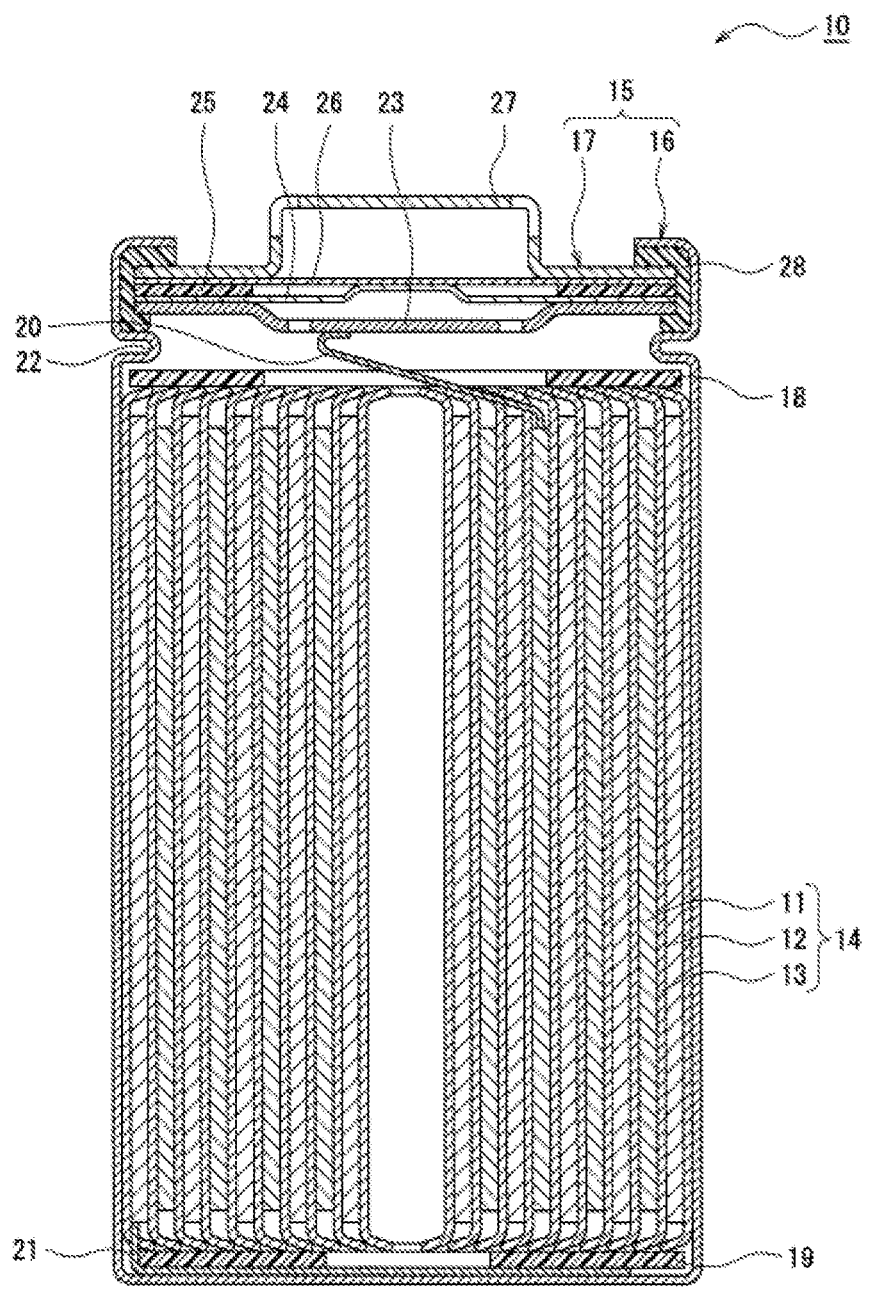
FIG. 1 is a sectional view of a secondary battery according to an embodiment.

Hereinafter, one example of a battery according to one aspect of the present disclosure will be described. The drawings mentioned in the description of embodiments below are schematically illustrated, and the dimensional ratio or the like of each component depicted in the drawings may be different from actual one in some cases.

FIG. 1 is a sectional view of a secondary battery according to an embodiment. A secondary battery 10 illustrated in FIG. 1 is illustrated as one example of a lithium ion secondary battery, and the secondary battery according to the embodiment is not limited to a lithium ion secondary battery and may be any other secondary battery such as an alkaline secondary battery. Hereinafter, the secondary battery 10 in FIG. 1 is referred to as "lithium ion secondary battery 10".

The lithium ion secondary battery 10 illustrated in FIG. 1 comprises a wound-type electrode assembly 14 obtained by winding a positive electrode 11 and a negative electrode 12 with a separator 13 interposed therebetween, a non-aqueous electrolyte, insulating plates 18 and 19 disposed on and under the electrode assembly 14, respectively, a positive electrode tab 20, a negative electrode tab 21, and a battery case 15.

The electrode assembly 14 is not limited to a wound type, and other form such as a stacked type where a positive electrode and a negative electrode are alternately stacked with a separator interposed therebetween may be applied.

The battery case 15 is to house, for example, the electrode assembly 14 and the non-aqueous electrolyte, and comprises a bottomed circular cylindrical case body 16 having an opening, and a sealing assembly 17 which seals the opening in the case body 16. The battery case 15 desirably comprises a gasket 28 provided between the case body 16 and the sealing assembly 17, and thus sealability of the interior of the battery is ensured. The battery case 15 is not limited to a circular cylindrical case, and may be, for example, a square or laminate type case.

The case body 16 has, for example, a projecting portion 22 in which a side surface portion is partially projected on the inside and which supports the sealing assembly 17. The projecting portion 22 is preferably formed annularly along with the circumferential direction of the case body 16, and supports the sealing assembly 17 by the upper surface thereof.

The sealing assembly 17 has a structure where a filter 23, a lower vent member 24, an insulating member 25, an upper vent member 26 and a cap 27 are stacked closer to the electrode assembly 14 in the listed order. Such members constituting the sealing assembly 17 each have, for example, a disc shape or a ring shape, and such members except for the insulating member 25 are electrically connected to one another. The lower vent member 24 and the upper vent member 26 are connected to each other at the respective center portions thereof, and the insulating member 25 is interposed between respective peripheral edge portions. If the internal pressure is increased by heat generation due to internal short-circuit or the like, for example, the lower vent member 24 is deformed in such a way as to push the upper vent member 26 toward the cap 27 and fractured, thereby blocking a current pathway between the lower vent member 24 and the upper vent member 26. If the internal pressure is further increased, the upper vent member 26 is fractured, causing any gas to be emitted through an opening in the cap 27.

One end portion of the positive electrode tab 20 is connected to the positive electrode 11. The positive electrode tab 20 extends from the positive electrode 11 to the filter 23 through a through-hole of the insulating plate 18, and the other end portion of the positive electrode tab 20 is connected to the lower surface of the filter 23. Thus, the sealing assembly 17 (substantially the cap 27 electrically connected to the filter 23) serves as a positive electrode terminal. One end portion of the negative electrode tab 21 is connected to the negative electrode 12. The negative electrode tab 21 extends from the negative electrode 12 to the inner surface of the bottom of the case body 16 through the outside of the insulating plate 19, and the other end portion of the negative electrode tab 21 is connected to the inner surface of the bottom of the case body 16. Thus, the case body 16 serves as a negative electrode terminal.

Figure 2A:
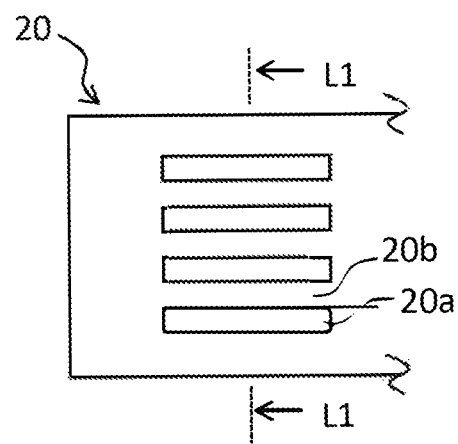
FIG. 2(A) is a plan view of the other end portion of a positive electrode tab connected to a sealing assembly.
Figure 2B:
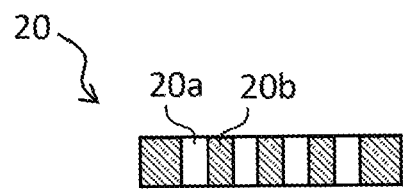
FIG. 2(B) is a sectional view along with a L1-L1 line in FIG. 2(A).

FIG. 2(A) is a plan view of the other end portion of a positive electrode tab connected to a sealing assembly, and FIG. 2(B) is a sectional view along with a L1-L1 line in FIG. 2(A). As illustrated in FIG. 2, a positive electrode tab 20 has a plurality of slits 20*a* disposed at a predetermined interval on the other end portion connected to a sealing assembly 17, and each fuse part 20*b* interposed between the plurality of slits 20*a*. Such each fuse part 20*b* corresponds to a region relatively small in sectional area, of the positive electrode tab 20. The slits 20*a* penetrate in the thickness direction of the positive electrode tab 20, as illustrated in FIG. 2(B). In FIG. 2, three such fuse parts 20*b* interposed among four slits 20*a* of a rectangular shape are constituted, and the total sectional area of the three fuse parts 20*b* is smaller than a sectional area of the positive electrode tab 20, the sectional area except for any area where the fuse parts 20*b* are formed. The number of the fuse parts 20*b* is not particularly limited, and is preferably two or more.

The fuse parts 20*b* are metallurgically bonded to the sealing assembly 17 (substantially filter 23) serving as a positive electrode terminal. That is, such fuse parts 20*b* are connected to the lower surface of the filter 23. The metallurgical bonding method is, for example, resistance welding, ultrasonic welding or laser welding, and is not particularly limited.

In external short-circuit, heat is collectively generated on any fuse part 20*b* relatively small in sectional area and such any fuse part 20*b* is fused, thereby causing connection of the positive electrode tab 20 and the sealing assembly 17 serving as a positive electrode terminal to be cut, to result in current blocking. Furthermore, in the present embodiment, the fuse parts 20*b* are metallurgically bonded to the sealing assembly 17 serving as a positive electrode terminal, and thus the resistance of the fuse parts 20*b* is determined by adding the resistance of any location metallurgically bonded. That is, any fuse part 20*b* metallurgically bonded to a positive electrode terminal has a high resistance value as compared with a fuse part provided at a location where bonding to a positive electrode terminal is not made, and thus high heat is generated in external short-circuit and fusing is easily made. As a result, a current blocking function is rapidly operated in external short-circuit, allowing an increase in battery temperature to be suppressed. Such fuse parts 20*b* in the present embodiment are metallurgically bonded to a positive electrode terminal and thus have high strength. Accordingly, such fuse parts 20*b*, if any impact or vibration is applied to the battery, are hardly broken in normal times where no external short-circuit occurs.

The sectional area of such a fuse part 20*b* (the total sectional area in the case of a plurality of fuse parts) is not particularly limited, and is preferably, for example, in the range from 0.19 to 0.48 mm$^2$ in terms of the current blocking function, strength, and the like. The width of one of such slits 20*a* is not particularly limited, and is preferably, for example, in the range from 0.03 to 1.90 mm in terms of the current blocking function, strength, and the like.

As illustrated in FIG. 2, in a case where a plurality of fuse parts 20*b* are present, one of such fuse parts 20*b* may be metallurgically bonded to a positive electrode terminal, and two or more of such fuse parts 20*b* are preferably metallurgically bonded to a positive electrode terminal in terms of the current blocking function, strength, and the like.

The planar view shape of each of the slits 20*a* is not limited to a rectangular shape illustrated in FIG. 2(A), and may be any of a circular or elliptical shape, a multangular shape such as a triangular shape or a pentagonal shape, or a wave shape.

The shape of such a fuse part 20*b* may be any shape as long as such a shape corresponds to a region relatively small in sectional area. Hereinafter, a modified example of such a fuse part 20*b* will be described.

Figure 3A:
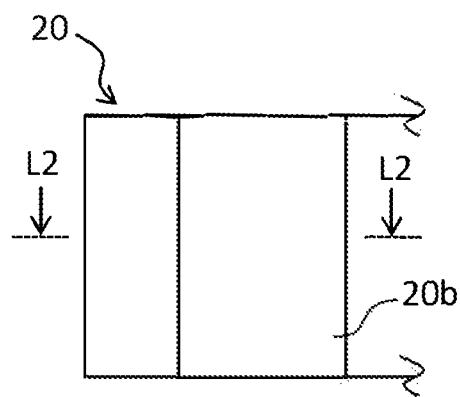
FIG. 3(A) is a plan view illustrating a modified example of a fuse part of a positive electrode tab.
Figure 3B:
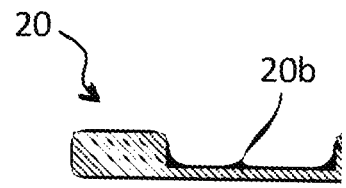
FIG. 3(B) is a sectional view along with a L2-L2 line in FIG. 3(A).

FIG. 3(A) is a plan view illustrating a modified example of a fuse part of a positive electrode tab, and FIG. 3(B) is a sectional view along with a L2-L2 line in FIG. 3(A). As illustrated in FIG. 3, a fuse part 20*b* provided on the other end portion of a positive electrode tab 20 is a thin-walled portion obtained by thinning the positive electrode tab 20. The thickness and the width of the fuse part 20*b* as a thin-walled portion are not particularly limited as long as these are set such that the sectional area of the fuse part 20*b* is smaller than the sectional area of the positive electrode tab 20 except for the fuse part 20b, and are, for example, in the thickness range from 0.05 mm to 0.2 mm and in the width range from 2 mm to 5 mm.

Figure 4A:
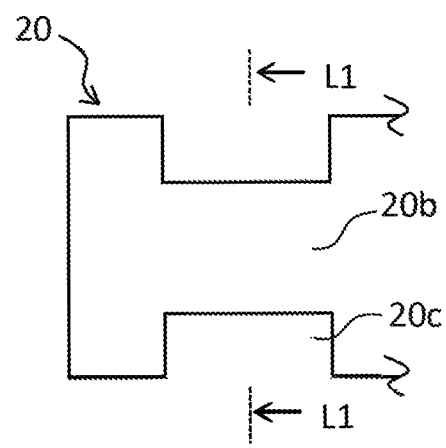
FIG. 4(A) is a plan view illustrating a modified example of a fuse part of a positive electrode tab.
Figure 4B:
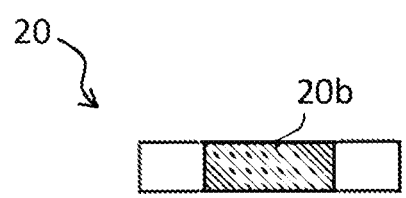
FIG. 4(B) is a sectional view along with a L1-L1 line in FIG. 4(A).

FIG. 4(A) is a plan view illustrating a modified example of a fuse part of a positive electrode tab, and FIG. 4(B) is a sectional view along with a L1-L1 line in FIG. 4(A). As illustrated in FIG. 4, a fuse part 20b provided on the other end portion of a positive electrode tab 20 corresponds to a region interposed between a pair of notch portions 20c formed on both ends in the width direction of the positive electrode tab 20. The length and the width of each of the notch portions 20c are not particularly limited as long as these are set such that the sectional area of the fuse part 20b is smaller than the sectional area of the positive electrode tab 20 except for the fuse part 20b, and are, for example, in the length range from 1 mm to 5 mm and in the width range from 0.025 mm to 1 mm. The planar view shape of each of the notch portions 20c is not limited to any rectangular shape illustrated in FIG. 4(A), and may be an arc-like shape or the like.

Figure 5A:
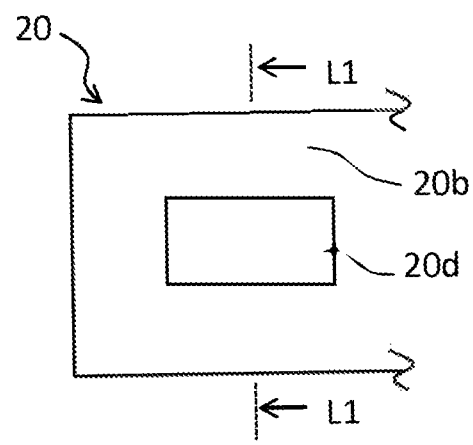
FIG. 5(A) is a plan view illustrating a modified example of a fuse part of a positive electrode tab.
Figure 5B:
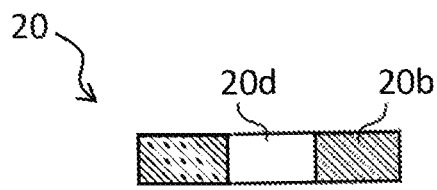
FIG. 5(B) is a sectional view along with a L1-L1 line in FIG. 5(A).

FIG. 5(A) is a plan view illustrating a modified example of a fuse part of a positive electrode tab, and FIG. 5(B) is a sectional view along with a L1-L1 line in FIG. 5(A). As illustrated in FIG. 5, a fuse part 20b provided on the other end portion of a positive electrode tab 20 corresponds to a region interposed between a slit 20d provided at the center of the positive electrode tab 20 and an end portion in the width direction of the positive electrode tab 20. The planar view shape of the slit 20d is not limited to any rectangular shape as illustrated in FIG. 5(A), and is a circular shape or the like without any particular limitation, as in the slits 20a described above.

A network-, lattice- or honeycomb-shaped fuse part 20b may be formed by disposing a plurality of slits (20a, 20d) at a predetermined interval in the width direction and the length direction of the positive electrode tab 20.

Although the illustration is omitted, the negative electrode tab 21 also has the above fuse part again. That is, the negative electrode tab 21 has a fuse part which corresponds to a region relatively small in sectional area, of the negative electrode tab 21, on the other end portion connected to the case body 16. The fuse part of the negative electrode tab 21 is metallurgically bonded to the case body 16 serving as a negative electrode terminal. The form of the fuse part may be the same as the forms of the fuse parts 20b illustrated in FIGS. 2 to 5. Thus, the current blocking function is rapidly operated even in the negative electrode tab 21 in external short-circuit to suppress an increase in battery temperature.

The present embodiment may be configured such that at least any one of the positive electrode tab 20 and the negative electrode tab 21 has the above fuse part. The fuse part provided in the positive electrode tab 20 is metallurgically bonded to the sealing assembly 17 serving as a positive electrode terminal or the fuse part provided in the negative electrode tab 21 is metallurgically bonded to the case body 16, or both thereof are made. Even the configuration where at least any one of the positive electrode tab 20 and the negative electrode tab 21 has the above fuse part also allows an increase in battery temperature to be suppressed by the current blocking function with the fuse part.

In the present embodiment, while the positive electrode tab 20 is connected to the sealing assembly 17 to allow for the sealing assembly 17 serving as a positive electrode terminal and the negative electrode tab 21 is connected to the case body 16 to allow for the case body 16 serving as a negative electrode terminal, there is no limitation thereto and the reverse configuration may also be adopted. That is, the positive electrode tab 20 may be connected to the case body 16 to allow for the case body 16 serving as a positive electrode terminal and the negative electrode tab 21 may be connected to the sealing assembly 17 to allow for the sealing assembly 17 serving as a negative electrode terminal. In such a case, the fuse part provided in the positive electrode tab 20 is metallurgically bonded to the case body 16 serving as a positive electrode terminal or the fuse part provided in the negative electrode tab 21 is metallurgically bonded to the sealing assembly 17, or both thereof are made.

Figure 6:
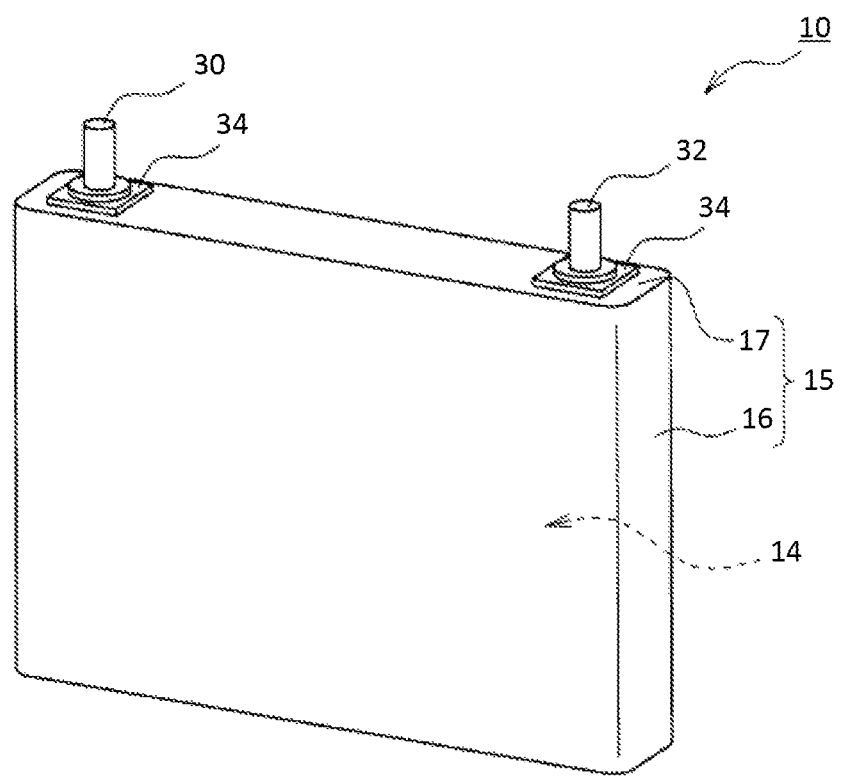
FIG. 6 is a perspective view illustrating another example of a secondary battery according to an embodiment.

The present embodiment also encompasses a secondary battery where a positive electrode terminal and a negative electrode terminal are provided independent from the sealing assembly 17 and the case body 16. For example, as illustrated in FIG. 6, a secondary battery 10 may also be adopted where a battery case 15 comprises a substantially box-shaped case body 16 housing an electrode assembly 14 and the like, and a sealing assembly 17 closing an opening in the case body 16, and a positive electrode terminal 30 and a negative electrode terminal 32 are provided with an insulating plate 34 interposed therebetween in the sealing assembly 17. A fuse part of a positive electrode tab is metallurgically bonded to the positive electrode terminal 30 or a fuse part of a negative electrode tab is metallurgically bonded to the negative electrode terminal 32, or both thereof are made, in the battery case 15 of such a secondary battery 10.

Hereinafter, the positive electrode 11, the negative electrode 12, the non-aqueous electrolyte and the separator 13 will be described in detail.

The positive electrode 11 comprises a positive electrode current collector and a positive electrode active material layer formed on the positive electrode current collector. The positive electrode current collector here used is, for example, foil of a metal stable in the potential range of the positive electrode, such as aluminum, or a film where the metal is disposed on a front surface. The positive electrode active material layer includes a positive electrode active material. The positive electrode active material layer suitably includes, in addition to the positive electrode active material, a conductive agent and a binder.

Examples of the positive electrode active material included in the positive electrode active material layer include a lithium transition metal composite oxide, specifically, lithium cobaltite, lithium manganate, lithium nickelate, lithium nickel manganese composite oxide, lithium nickel cobalt composite oxide, or the like can be used, and Al, Ti, Zr, Nb, B, W, Mg, Mo, and/or the like may be added to such a lithium transition metal composite oxide.

Examples of the conductive agent included in the positive electrode active material layer include respective carbon powders of carbon black, acetylene black, Ketjen black, and graphite. These may be used singly or in combinations of two or more thereof.

Examples of the binder included in the positive electrode active material layer include a fluoropolymer and a rubber-based polymer. Examples include fluoropolymers such as polytetrafluoroethylene (PTFE), polyvinylidene fluoride (PVdF) and a modified product thereof, and rubber-based polymers such as an ethylene-propylene-isoprene copolymer and an ethylene-propylene-butadiene copolymer. These may be used singly or in combinations of two or more thereof.

The negative electrode 12 comprises a negative electrode current collector and a negative electrode active material layer formed on the negative electrode current collector. The negative electrode current collector which can be here used is, for example, foil of a metal stable in the potential range of the negative electrode, such as copper, or a film where the metal is disposed on a front surface. The negative electrode active material layer includes a negative electrode active material. The negative electrode active material layer suitably includes, in addition to the negative electrode active material, a thickener and a binder.

A carbon material that can occlude and release lithium ions can be used as the negative electrode active material, and not only graphite, but also hardly graphitizable carbon, easily graphitizable carbon, fibrous carbon, coke, carbon black, and the like can be used. Furthermore, silicon, tin, and an alloy and an oxide mainly thereof can be used as a non-carbon-based material.

While PTFE or the like can also be used as the binder as in the case of the positive electrode, for example, a styrene-butadiene copolymer (SBR) or a modified product thereof may also be used. The thickener which can be here used is, for example, carboxymethylcellulose (CMC).

The non-aqueous electrolyte includes, for example, a non-aqueous solvent and an electrolyte salt dissolved in the non-aqueous solvent. The non-aqueous electrolyte is not limited to a liquid electrolyte, and may be a solid electrolyte using a gel-like polymer or the like. The non-aqueous solvent here used is, for example, any of carbonates, lactones, ethers, ketones, esters, and a mixed solvent of two or more thereof.

Examples of the electrolyte salt include a lithium salt, and for example, $LiPF_6$, $LiBF_4$, $LiCF_3SO_3$, and a mixture of two or more thereof are used. The amount of the electrolyte salt dissolved in the solvent is, for example, 0.5 to 2.0 mol/L.

For example, a porous sheet having ion permeability and insulating properties is used for the separator 13. Specific examples of the porous sheet include a microporous thin film, a woven cloth and an unwoven cloth. The material of the separator 13 is suitably an olefin-based resin such as polyethylene or polypropylene, cellulose, or the like. The separator 13 may be a laminated body having a cellulose fiber layer and a thermoplastic resin fiber layer of an olefin-based resin or the like. The separator may be a multi-layer separator including a polyethylene layer and a polypropylene layer, and one may be used where the surface of the separator is coated with a material such as an aramid resin or ceramic.

EXAMPLES

Hereinafter, the present invention will be further described with reference to Examples, but the present invention is not limited by these Examples.

Example 1

<Positive Electrode>

One hundred parts by mass of lithium composite oxide represented by $LiNi_{0.91}Co_{0.06}Al_{0.03}O_2$ as a positive electrode active material, 1 part by mass of PVDF as a binder and 1 part by mass of acetylene black as a conductive agent were mixed, a proper amount of N-methyl-2-pyrrolidone (NMP) was added to the mixture and the resultant was mixed to thereby prepare a positive electrode mixture slurry. After both surfaces of a positive electrode current collector made of aluminum foil (thickness: 13 μm) were coated with the positive electrode mixture slurry and dried, the resultant was rolled to thereby produce a positive electrode where a positive electrode active material layer was formed on each of both surfaces of the positive electrode current collector.

<Positive Electrode Tab>

Four slits each having a width of 1.9 mm were formed on an end portion of a positive electrode tab made of aluminum at a predetermined interval in the width direction of the positive electrode tab, thereby forming three fuse parts interposed among the slits. The total sectional area of the three fuse parts was 0.48 mm². The sectional area of the positive electrode tab except for such fuse parts was here 0.53 mm².

An exposed portion where no positive electrode active material was formed on the positive electrode current collector was provided on a portion of the positive electrode, and an end portion (end portion where no fuse part was formed) of the positive electrode tab was welded to the exposed portion.

<Negative Electrode>

One hundred parts by mass of a mixture (93:7 on a mass ratio) of graphite and silicon oxide, as a negative electrode active material, 1 part by mass of carboxymethylcellulose as a thickener and 1 part by mass of styrene-butadiene rubber as a binder were mixed, and the mixture was kneaded in water to thereby prepare a negative electrode mixture slurry. After both surfaces of a negative electrode current collector made of copper foil (thickness: 6 μm) were coated with the negative electrode mixture slurry and dried, the resultant was rolled to thereby produce a negative electrode where a negative electrode active material layer was formed on each of both surfaces of the negative electrode current collector.

An exposed portion where no negative electrode active material was formed on the negative electrode current collector was provided on a portion of the negative electrode, and an end portion of a negative electrode tab made of copper was welded to the exposed portion.

<Non-Aqueous Electrolytic Solution>

A non-aqueous electrolytic solution was prepared by mixing fluoroethylene carbonate, methyl ethyl carbonate and dimethyl carbonate such that a volume ratio of 15:45:40 was achieved, adding 1.5 parts by mass of vinylene carbonate to 100 parts by mass of the mixed solvent, and furthermore dissolving $LiPF_6$ at a concentration of 1.3 mol/L.

<Secondary Battery>

The positive electrode and the negative electrode produced as above were wound with a separator made of a polyethylene microporous film interposed between both the electrodes, to thereby obtain an electrode assembly. Insulating plates were disposed on and under the electrode assembly, respectively, and the resultant was housed in a bottomed circular cylindrical case body. A fuse part of the positive electrode tab was welded to a sealing assembly and the negative electrode tab was welded to the case body. After the non-aqueous electrolytic solution was injected into the case body, an opening in the case body was sealed by the sealing assembly, to thereby produce a non-aqueous electrolyte secondary battery.

[Evaluation]

An external short-circuit test was performed by the following method. Five batteries of Example 1 were prepared, and charged at a constant current of 1500 mA until the battery voltage reached 4.25 V under an environment of 25° C. After the charge, the batteries were left to still stand under an environment of 60° C. for 1 hour. Thereafter, the positive electrode and the negative electrode of each of the batteries after the charge were subjected to external short-circuit with a predetermined test circuit (resistance value: 0.02Ω) under an environment of 60° C. At this time, the number of any batteries where the battery surface temperature (hereinafter, simply referred to as "battery temperature") was 80° C. or more was examined. Any battery where the battery temperature was less than 80° C. was determined as a battery having excellent safety in the external short-circuit test. The test results were shown in Table 1.

Examples 2 to 6

A secondary battery was produced in the same manner as in Example 1 except that the width of each slit was changed to 0.03 mm and the number of slits was changed such that the total sectional area of a slit portion was 0.48 mm² in Example 2. The secondary battery was used to perform the external short-circuit test under the same conditions as in Example 1. The test results were shown in Table 1.

A secondary battery was produced in the same manner as in Example 1 except that the thickness and the width of the positive electrode tab and the number of slits were changed and the total sectional area of a slit portion was changed to 0.19 mm² in Example 3. The secondary battery was used to perform the external short-circuit test under the same conditions as in Example 1. The test results were shown in Table 1.

A secondary battery was produced in the same manner as in Example 1 except that the width of each slit was changed to 0.03 mm and the number of slits was changed to change the total sectional area of a slit portion to 0.19 mm² in Example 4. The secondary battery was used to perform the external short-circuit test under the same conditions as in Example 1. The test results were shown in Table 1.

The secondary battery of Example 3 was used in Example 5. The external short-circuit test was performed under the same conditions as in Example 1 except that a test circuit (resistance value: 0.05Ω) was used. The test results were shown in Table 1.

The secondary battery of Example 4 was used in Example 6. The external short-circuit test was performed under the same conditions as in Example 1 except that a test circuit (resistance value: 0.05Ω) was used. The test results were shown in Table 1.

Comparative Examples 1 to 2

A secondary battery was produced in the same manner as in Example 1 except that a positive electrode tab with no slit portion provided was used in Comparative Example 1. The secondary battery was used to perform the external short-circuit test under the same conditions as in Example 1. The test results were shown in Table 1.

The secondary battery produced in Comparative Example 1 was used in Comparative Example 2. The external short-circuit test was performed under the same conditions as in Example 1 except that a test circuit (resistance value: 0.05Ω) was used. The results were shown in Table 1.

TABLE 1

|  | Sectional area of fuse part [mm²] | Slit width [mm] | Circuit resistance [Ω] | Number of batteries reaching 80° C. or more |
|---|---|---|---|---|
| Example 1 | 0.48 | 1.9 | 0.02 | 0/5 |
| Example 2 | 0.48 | 0.03 | 0.02 | 0/5 |
| Example 3 | 0.19 | 1.9 | 0.02 | 0/5 |
| Example 4 | 0.19 | 0.03 | 0.02 | 0/5 |
| Example 5 | 0.19 | 1.9 | 0.05 | 0/5 |
| Example 6 | 0.19 | 0.03 | 0.05 | 0/5 |
| Comparative Example 1 | — | — | 0.02 | 5/5 |
| Comparative Example 2 | — | — | 0.05 | 5/5 |

TABLE 1-continued

The battery temperatures of all the batteries in Examples 1 to 6 in external short-circuit were less than 80° C. On the other hand, the battery temperatures of all the batteries in Comparative Examples 1 to 2 in external short-circuit were 80° C. or more. The results were due to fusing of the fuse part metallurgically bonded to the sealing assembly serving as a positive electrode terminal in external short-circuit and thus current blocking in each of Examples 1 to 6.

REFERENCE SIGNS LIST 10 lithium ion secondary battery
11 positive electrode
12 negative electrode
13 separator
14 electrode assembly
15 battery case
16 case body
17 sealing assembly
18, 19, 34 insulating plate
20 positive electrode tab
20a, 20d slit
20b fuse part
20c notch portion
21 negative electrode tab
22 projecting portion
23 filter
24 lower vent member
25 insulating member
26 upper vent member
27 cap
28 gasket
30 positive electrode terminal
32 negative electrode terminal

The invention claimed is:
1. A secondary battery, comprising:
an electrode assembly having a positive electrode, a negative electrode and a separator interposed between the positive electrode and the negative electrode;
a positive electrode terminal;
a negative electrode terminal;
a positive electrode tab which connects the positive electrode and the positive electrode terminal; and
a negative electrode tab which connects the negative electrode and the negative electrode terminal; wherein
the positive electrode tab has a non-fuse part, and a fuse part smaller in sectional area than the non-fuse part, and
the secondary battery further comprising:
a section of the fuse part of the positive electrode tab in which at least one of the group consisting of one or more slits, a thin-walled portion, and a notch portion are/is formed in a longitudinal direction of the positive electrode tab, wherein the section is metallurgically bonded to the positive electrode terminal.
2. A secondary battery, comprising:
an electrode assembly having a positive electrode, a negative electrode and a separator interposed between the positive electrode and the negative electrode;

a positive electrode terminal;

a negative electrode terminal;

a positive electrode tab which connects the positive electrode and the positive electrode terminal; and a negative electrode tab which connects the negative electrode and the negative electrode terminal; wherein the negative electrode tab has a non-fuse part, and a fuse part smaller in sectional area than the non-fuse part, and the secondary battery further comprising:

a section of the fuse part of the negative electrode tab in which at least one of the group consisting of one or more slits, a thin-walled portion, and a notch portion are/is formed in a longitudinal direction of the negative electrode tab, wherein the section is metallurgically bonded to the negative electrode terminal.

3. The secondary battery according to claim 1, having a case body that houses the electrode assembly and a sealing assembly that seals an opening in the case body, wherein one of the case body and the sealing assembly serves as the positive electrode terminal, and the other of the case body and the sealing assembly serves as the negative electrode terminal.

4. The secondary battery according to claim 1, wherein a sectional area of the fuse part is in the range from 0.19 to 0.48 mm$^2$.

5. The secondary battery according to claim 1, wherein the positive electrode tab has a plurality of slits and the fuse part interposed between the plurality of slits.

6. The secondary battery according to claim 2, wherein the negative electrode tab has a plurality of slits and the fuse part interposed between the plurality of slits.

7. The secondary battery according to claim 5, wherein a width of one of the plurality of slits is in the range from 0.03 to 1.90 mm.

8. The secondary battery according to claim 2, having a case body that houses the electrode assembly and a sealing assembly that seals an opening in the case body, wherein one of the case body and the sealing assembly serves as the positive electrode terminal, and the other of the case body and the sealing assembly serves as the negative electrode terminal.

9. The secondary battery according to claim 2, wherein a sectional area of the fuse part is in the range from 0.19 to 0.48 mm$^2$.

10. The secondary battery according to claim 6, wherein a width of one of the plurality of slits is in the range from 0.03 to 1.90 mm.

11. The secondary battery according to claim 1, wherein the section of the fuse part of the positive electrode tab is a section of the fuse part in which slits are formed.

12. The secondary battery according to claim 2, wherein the section of the fuse part of the negative electrode tab is a section of the fuse part in which slits are formed.

* * * * *